(12) United States Patent
Pelekhaty

(10) Patent No.: US 6,301,042 B1
(45) Date of Patent: Oct. 9, 2001

(54) FABRY-PEROT OPTICAL FILTER WITH CHIRPED DIELECTRIC MIRRORS

(75) Inventor: Vladimir Pelekhaty, Baltimore, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/232,133

(22) Filed: Jan. 14, 1999

Related U.S. Application Data

(60) Provisional application No. 60/071,537, filed on Jan. 15, 1998.

(51) Int. Cl.[7] .............................. G02B 1/10; G02B 5/20
(52) U.S. Cl. ...................... 359/359; 359/584; 359/588; 359/589; 359/590
(58) Field of Search ..................................... 359/359, 588, 359/589, 590, 584, 586

(56) References Cited

U.S. PATENT DOCUMENTS

| | | | |
|---|---|---|---|
| 4,501,470 | * | 2/1985 | Yeh ........................................ 359/589 |
| 4,756,602 | * | 7/1988 | Southwell et al. .................... 359/589 |
| 4,958,892 | | 9/1990 | Jannson et al. ....................... 350/3.6 |
| 5,099,359 | * | 3/1992 | Hrycin et al. ........................ 359/589 |
| 5,360,659 | | 11/1994 | Arends et al. ........................ 428/216 |
| 5,410,431 | | 4/1995 | Southwell ............................. 359/580 |
| 5,664,124 | * | 9/1997 | Hamada et al. ...................... 359/359 |
| 5,734,503 | * | 3/1998 | Szipocs et al. ....................... 359/584 |
| 5,777,793 | * | 7/1998 | Little et al. ........................... 359/589 |
| 5,912,915 | * | 6/1999 | Reed et al. ............................. 372/99 |
| 5,999,322 | * | 12/1999 | Cushing ................................ 359/589 |
| 6,018,421 | * | 1/2000 | Cushing ................................ 359/589 |
| 6,167,171 | * | 12/2000 | Grasis et al. ......................... 359/126 |

FOREIGN PATENT DOCUMENTS

| | | | |
|---|---|---|---|
| 2658619A1 | | 8/1991 | (FR) . |
| 0212403 | * | 12/1982 | (JP) .................................... 359/588 |
| 0018304 | * | 1/1988 | (JP) .................................... 359/588 |
| 0170101 | * | 6/1990 | (JP) .................................... 359/588 |

* cited by examiner

*Primary Examiner*—Cassandra Spyrou
*Assistant Examiner*—John Juba, Jr.
(74) *Attorney, Agent, or Firm*—Daniel N. Daisak; David L. Soltz

(57) ABSTRACT

An optical interference filter having high transmissivity at first and second passbands. The interference filter includes a first stack having a plurality of dielectric layers, a second stack having a plurality of dielectric layers, and a spacer interposed between the first and second stacks. Each of the dielectric layers included in the first and second stacks have optical thicknesses which vary quadratically. The dielectric layers have alternating high and low refractive indices.

24 Claims, 9 Drawing Sheets

| n | $t_n$ |
|---|---|
| 1 | 1.1500000 |
| 2 | 1.01102041 |
| 3 | 1.0765306 |
| 4 | 1.0489796 |
| 5 | 1.0275510 |
| 6 | 1.0122449 |
| 7 | 1.0030612 |
| 8 | 1.0000000 |
| 9 | 1.0030612 |
| 10 | 1.0122449 |
| 11 | 1.0275510 |
| 12 | 1.0489796 |
| 13 | 1.0765306 |
| 14 | 1.1102041 |
| 15 | 1.1500000 |

| m | $t_m$ |
|---|---|
| 1 | 1.1500000 |
| 2 | 1.1102041 |
| 3 | 1.0765306 |
| 4 | 1.0489796 |
| 5 | 1.0275510 |
| 6 | 1.0122449 |
| 7 | 1.0030612 |
| 8 | 1.0000000 |
| 9 | 1.0030612 |
| 10 | 1.0122449 |
| 11 | 1.0275510 |
| 12 | 1.0489796 |
| 13 | 1.0765306 |
| 14 | 1.1102041 |
| 15 | 1.1500000 |
| 16 | 1.6050000 |
| 17 | 1.1500000 |
| 18 | 1.1102041 |
| 19 | 1.0765306 |
| 20 | 1.0489796 |
| 21 | 1.0275510 |
| 22 | 1.0122449 |
| 23 | 1.0030612 |
| 24 | 1.0000000 |
| 25 | 1.0030612 |
| 26 | 1.0122449 |
| 27 | 1.0275510 |
| 28 | 1.0489796 |
| 29 | 1.0765306 |
| 30 | 1.1102041 |
| 31 | 1.1500000 |

FIG.8

| m | $t_n$ |
|---|---|
| 1 | .94000000 |
| 2 | .94406659 |
| 3 | .94799049 |
| 4 | .95177170 |
| 5 | .95541023 |
| 6 | .95890606 |
| 7 | .96225922 |
| 8 | .96546968 |
| 9 | .96853746 |
| 10 | .97146254 |
| 11 | .97424495 |
| 12 | .97688466 |
| 13 | .97938169 |
| 14 | .98173603 |
| 15 | .98394768 |
| 16 | .98601665 |
| 17 | .98794293 |
| 18 | .98972652 |
| 19 | .99136742 |
| 20 | .99286564 |
| 21 | .99422117 |
| 22 | .99543401 |
| 23 | .99650416 |
| 24 | .99743163 |
| 25 | .99821641 |
| 26 | .99885850 |
| 27 | .99935791 |
| 28 | .99971463 |
| 29 | .99992866 |
| 30 | .10000000 |
| 31 | .99992866 |
| 32 | .99971463 |
| 33 | .99935791 |
| 34 | .99885850 |
| 35 | .99821641 |
| 36 | .99743163 |
| 37 | .99650416 |
| 38 | .99543401 |
| 39 | .99422117 |
| 40 | .99286564 |
| 41 | .99136742 |

| m | $t_n$ |
|---|---|
| 42 | .98972652 |
| 43 | .98794293 |
| 44 | .98601665 |
| 45 | .98394768 |
| 46 | .98173603 |
| 47 | .97938169 |
| 48 | .97688466 |
| 49 | .97424495 |
| 50 | .97146254 |
| 51 | .96853746 |
| 52 | .96546968 |
| 53 | .96225922 |
| 54 | .95890606 |
| 55 | .95541023 |
| 56 | .95177170 |
| 57 | .94799049 |
| 58 | .94406659 |
| 59 | .94000000 |
| 60 | 2.6600000 |
| 61 | .94000000 |
| 62 | .94406659 |
| 63 | .94799049 |
| 64 | .95177170 |
| 65 | .95541023 |
| 66 | .95890606 |
| 67 | .96225922 |
| 68 | .96546968 |
| 69 | .96853746 |
| 70 | .97146254 |
| 71 | .97424495 |
| 72 | .97688466 |
| 73 | .97938169 |
| 74 | .98173603 |
| 75 | .98394768 |
| 76 | .98601665 |
| 77 | .98794293 |
| 78 | .98972652 |
| 79 | .99136742 |
| 80 | .99286564 |
| 81 | .99422117 |
| 82 | .99543401 |

| m | $t_n$ |
|---|---|
| 83 | .99650416 |
| 84 | .99743163 |
| 85 | .99821641 |
| 86 | .99885850 |
| 87 | .99935791 |
| 88 | .99971463 |
| 89 | .99992866 |
| 90 | .10000000 |
| 91 | .99992866 |
| 92 | .99971463 |
| 93 | .99935791 |
| 94 | .99885850 |
| 95 | .99821641 |
| 96 | .99743163 |
| 97 | .99650416 |
| 98 | .99543401 |
| 99 | .99422117 |
| 100 | .99286564 |
| 101 | .99136742 |
| 102 | .98972652 |
| 103 | .98794293 |
| 104 | .98601665 |
| 105 | .98394768 |
| 106 | .98173603 |
| 107 | .97938169 |
| 108 | .97688466 |
| 109 | .97424495 |
| 110 | .97146254 |
| 111 | .96853746 |
| 112 | .96546968 |
| 113 | .96225922 |
| 114 | .95890606 |
| 115 | .95541023 |
| 116 | .95177170 |
| 117 | .94799049 |
| 118 | .94406659 |
| 119 | .94000000 |

FIG. 10

FABRY-PEROT OPTICAL FILTER WITH CHIRPED DIELECTRIC MIRRORS

RELATED APPLICATION

This application claims the benefit of U.S. Provisional Application No. 60/071,537, filed Jan. 15, 1998.

FIELD OF THE INVENTION

The present invention relates generally to optical interference filters. More particularly, the present invention relates to a dual bandpass optical interference filter capable of transmitting optical channels within a first and second passbands.

BACKGROUND OF THE INVENTION

Optical interference filters rely on principles of interference that modify reflected intensities of light incident on a surface. A familiar example of interference is the colors created when light reflects from a thin layer of oil floating on water. Briefly stated, by modifying the interface of a substance and its environment with a third material, reflectivity of the substance can be significantly altered. This principle is used in the fabrication of optical interference filters. These filters can be used as one of, or as the main filtering element in optical add/drop multiplexers employed in optical communication systems to select one or more channels from a transmission signal.

In its most simple form, an optical interference filter includes a cavity which is comprised of two partial reflectors separated by a spacer. Each partial reflector, also referred to as a quarter-wave stack, is typically constructed by depositing alternating layers of high and low refractive index dielectric materials upon a substrate where each layer has an optical thickness (defined as: physical thickness×refractive index) of a quarter wave ($\lambda/4$) at the desired wavelength of the filter. The spacer is typically a half-wave (or multiple half-wave) layer. An interference filter has an associated transmission characteristic which is a function of the reflectance of the layers of high and low index materials associated with the stack.

In many applications, optical interference filters are constructed using multiple cavities. Typically, cavities are deposited on top of other cavities, with a quarter-wave layer of low index material therebetween. Multicavity filters produce transmission spectra that are preferred in optical communication systems where sharp slopes and square passbands are needed to select one or more optical channels. The larger the number of cavities employed, the steeper the slope of the transmission bandwidth associated with a particular filter. The transmission bandwidth of a multicavity filter is wider as compared with the transmission bandwidth associated with a single cavity filter.

FIG. 1 illustrates an exemplary transmission spectrum (normalized to 1.55 $\mu$m) for a quarter-wave stack having a plurality of high/low refractive index dielectric layers. The stack is tuned to reject wavelengths in the 1.5$\mu$m range and exhibits ripple sidelobes referenced at 5.

FIG. 2 is an exemplary transmission spectrum (normalized to 1.55 $\mu$m) for a single cavity optical interference filter utilizing a pair of stacks each having the transmission spectrum shown in FIG. 1. As can be seen in FIG. 2 the transmission response is acceptable at $\lambda/\lambda_0=1.0$ which corresponds to 1.55 $\mu$m ($\lambda/\lambda_0=1.55$ $\mu$m/1.55 $\mu$m). However, the response at 0.845 which corresponds to approximately 1.31 $\mu$m ($\lambda/\lambda_0=1.31$ $\mu$m/1.55 $\mu$m) falls on the sideband and/or within the ripple band of the transmission spectrum, thereby making transmission of a particular wavelength in this range unreliable. More specifically, the single cavity interference filter produces high transmittance at wavelengths referenced at 10, but also produces relatively low transmittance as referenced at 15. Thus, transmission at wavelengths in the 1.5 $\mu$m range may be reliable while transmission for wavelengths within the ripple band or sideband slope are subject to variations in the transmission characteristic. This is also true for wavelengths in the 1.6 $\mu$m range ($\lambda/\lambda_0=1.62$ $\mu$m/1.55 $\mu$m). FIG. 2 demonstrates that interference filters typically provide a single reliable passband.

As noted above, optical systems can utilize one or more interference filters to select particular channels from a transmission signal. For example, a first filter may be used to select a pay-load channel associated with voice and/or data transmission in the 1.5 $\mu$m range and a second filter is used to select a service channel in the 1.3 $\mu$m or 1.6 $\mu$m range which carries system level and/or network monitoring information. The use of two separate filters, however, has several disadvantages. First, it increases overall system cost since it requires the manufacture and installation of two individual components. Secondly, optical networks typically have a predetermined loss budget, if exceeded, can compromise signal integrity. Each component, in this case an optical filter, contributes some loss to the overall network. By using two separate filters to select a payload channel and a service channel, each filter negatively impacts a network's loss budget.

Thus, there is a need for a filtering element used with optical communication systems capable of selecting a first and a second optical passbands. There is a further need to provide such a filtering element which reliably selects at least one wavelength corresponding to a payload channel as well as a wavelength corresponding to a service channel within an optical network.

SUMMARY OF THE INVENTION

The invention meets these needs and avoids the above-referenced disadvantages by providing an optical interference filter that is capable of selecting a first and second optical passbands. An optical interference filter is provided which comprises a substrate having a surface and a first stack deposited on the substrate surface. The first stack includes a first plurality of dielectric layers where each of selected ones of the first plurality of dielectric layers has a respective one of a plurality of first optical thicknesses. The plurality of optical thicknesses vary in a first direction with respect to the substrate. The interference filter further comprises a second stack which includes a second plurality of dielectric layers where each of selected ones of the second plurality of dielectric layers has a respective one of a plurality of second optical thicknesses. The plurality of optical thicknesses vary in the first direction with respect to the substrate. A spacer is interposed between the first and second stacks.

The foregoing, and other features and advantages of the present invention, will be apparent from the following description, the accompanying drawings and the appended claims.

BRIEF DESCRIPTION OF THE DRAWINGS

FIG. 8 illustrates optical thickness values, in quarter-waves for a single cavity interference filter in accordance with the present invention.

FIG. 10 illustrates optical thickness values, in quarter-waves, for 119 layers included within a single cavity interference filter in accordance with the present invention.

DETAILED DESCRIPTION OF THE PREFERRED EMBODIMENTS

The present invention provides an optical interference filter that has high transmittance (or reflectance close to zero) for a first and a second optical passbands. In one embodiment of the present invention, the interference filter is capable of selecting a wavelength corresponding to a payload channel in the 1.5 μm range and a second wavelength corresponding to a service channel in the 1.3 μm range. In another embodiment, the interference filter is capable of selecting a wavelength corresponding to a payload channel in the 1.5 μm range and a wavelength corresponding to a service channel in the 1.6 μm range. It should be understood that the present invention can be configured to select other wavelengths as well as passbands which include a plurality of optical wavelengths.

Figure 1:
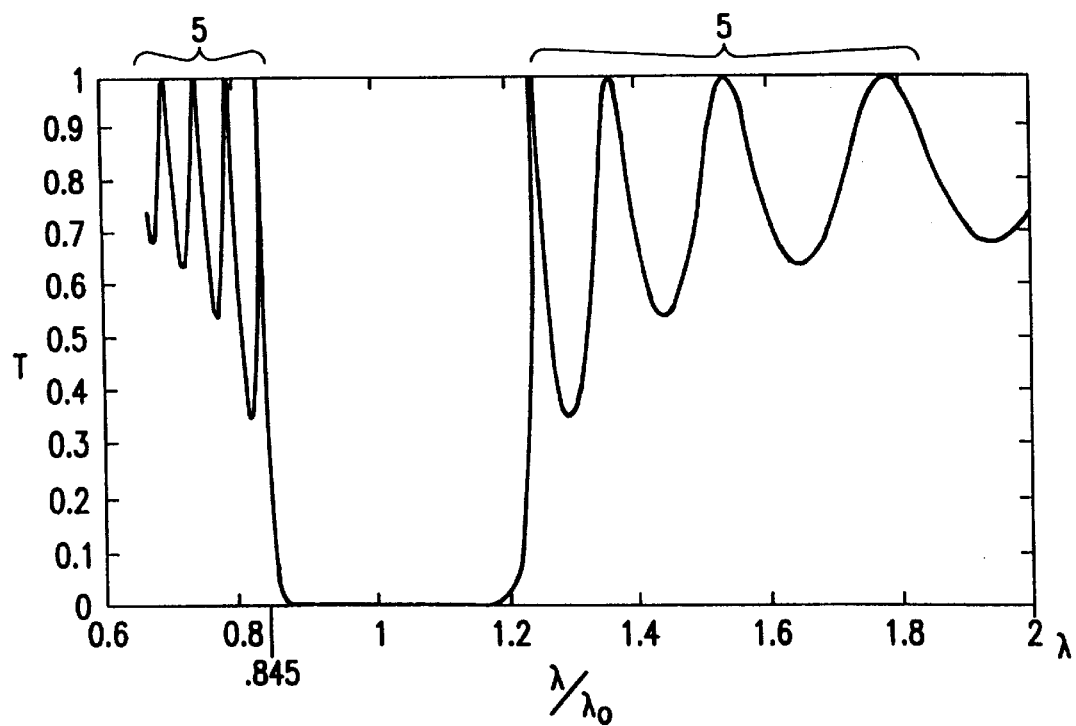
FIG. 1 illustrates a transmission spectrum (normalized to 1.55 $\mu$m) for an exemplary quarter-wave stack.
Figure 2:
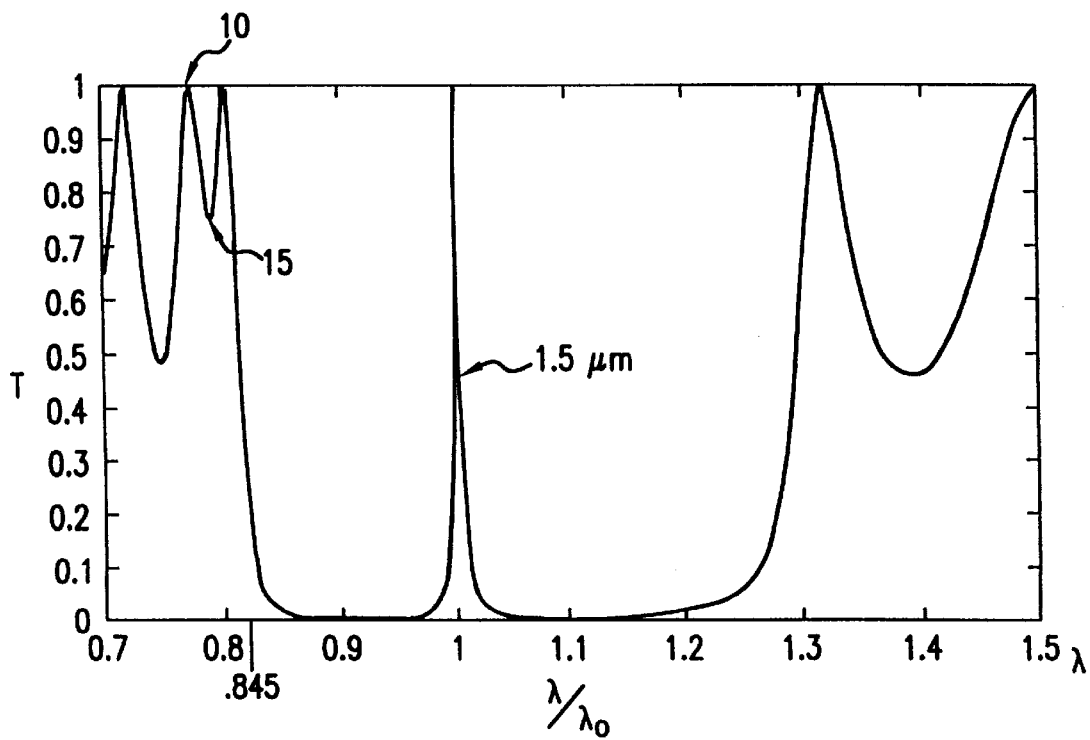
FIG. 2 illustrates a transmission spectrum (normalized to 1.55 $\mu$m) for a single cavity optical interference filter.
Figures 3, 4:
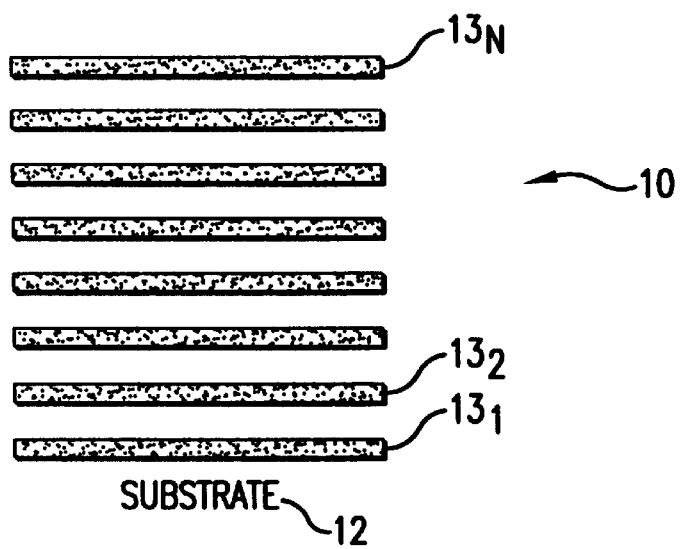
FIG. 3 schematically illustrates a quadratically chirped stack deposited upon a transparent substrate in accordance with the present invention.
FIG. 4 illustrates optical thickness values, in quarter-waves, for 15 dielectric layers included within the stack shown in FIG. 3 in accordance with the present invention.

Turning to the drawings where like reference numbers indicate like elements, FIG. 3 schematically illustrates a fifteen layer stack 10 (also referred to as a mirror or partial mirror) deposited upon a transparent substrate 12 which can be, for example, glass, silica, etc. Stack 10 includes dielectric layers $13_1 \ldots 13_N$ where N=15 in this exemplary configuration. Each of the layers $13_1 \ldots 13_N$ alternates between a layer $13_1$ with a high refractive index, such as $Ta_2O_5$ (refractive index=2.05), and a layer $13_2$ with a low refractive index, such as $SiO_2$ (refractive index=1.44). The number of dielectric layers as well as the materials selected as the dielectric layers which form stack 10 are dependent upon the bandwidth of the desired filter. Exemplary materials, in addition to the ones mentioned above, include, but are not limited to, $TiO_2$ (refractive index=2.25), $Al_2O_3$ (refractive index=1.6), $HfO_2$ (refractive index=1.971), $ZrO_2$ (refractive index=2.035), etc.

Figure 5:
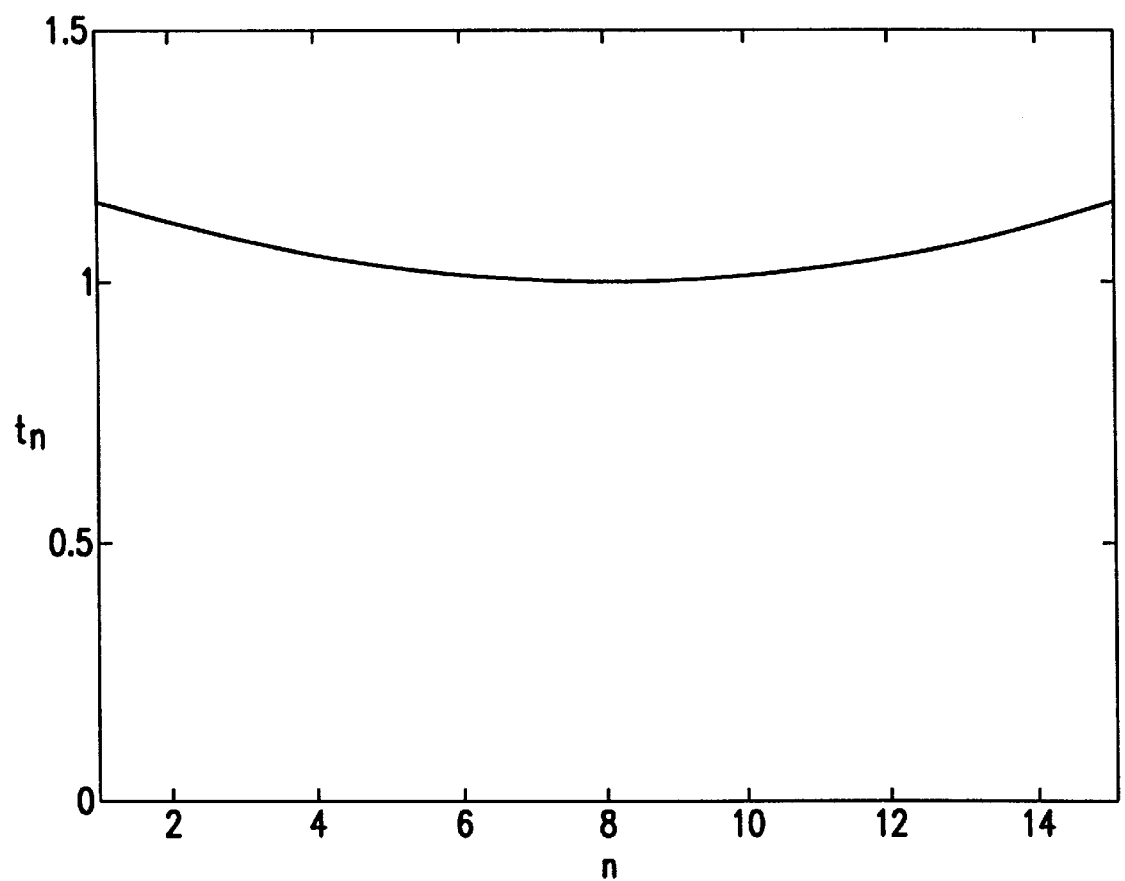
FIG. 5 is a graphical illustration of the optical thickness values of the dielectric layers listed in FIG. 4.

Dielectric layers $13_1 \ldots 13_N$ have optical thickness values which are quadratically chirped. (Because FIG. 3 is a schematic representation of a fifteen layer stack, the optical thicknesses of the layers shown are not to scale.) To describe what is meant by quadratically chirped, FIG. 4 illustrates exemplary optical thickness values ($t_n$) for each of the fifteen dielectric layers $13_1 \ldots 13_{15}$ included in stack 10. It should be understood that these thicknesses are provided for illustrative purposes only with respect to exemplary passbands. As can be seen, layers $13_1$ and $13_{15}$ have substantially the same optical thickness, layers $13_2$ and $13_{14}$ also have substantially the same optical thickness and so on until layer $13_8$, which is the center layer and does not have a corresponding symmetric layer. The thickness of each layer varies based on the following equation:

$$t_n = 1 + 0.15 \left[ \frac{\frac{(N-1)}{2} - n + 1}{\frac{(N-1)}{2}} \right]^2 \quad (1)$$

where $t_n$ is the resulting optical thickness associated with a particular layer, N is the total number of layers used to form an individual stack or mirror and n is the number of the particular layer within the stack. The quadratic chirping of the dielectric layers comprising a stack results in layers having substantially noniqluarter wave optical thicknesses. FIG. 5 is a graphical representation of the dielectric layer optical thicknesses of stack 10 shown in FIG. 4 and in accordance with equation (1). As seen in FIG. 5, the graph has a somewhat concave shape, and hence equation (1) is referred to as a concave stack. It should be understood that adjacent layers within the quadratically chirped stack can have substantially equal optical thicknesses while retaining this considerable concave shape.

Figure 6:
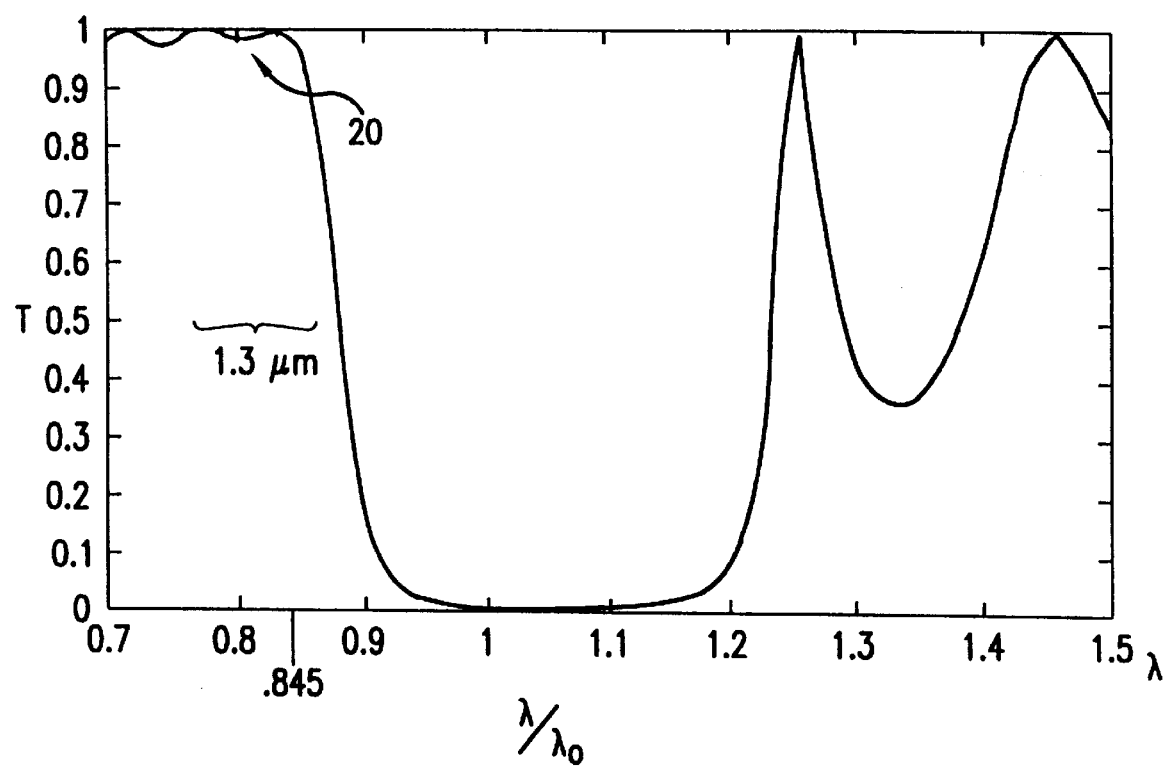
FIG. 6 illustrates a normalized transmission spectrum for an exemplary 15 layer quadratically chirped stack in accordance with the present invention.

FIG. 6 illustrates a transmission spectrum normalized to 1.55 μm for the exemplary fifteen layer quadratically chirped stack 10 represented by equation (1). For normalized wavelength values from approximately 0.9 to 1.2 (1.5 μm range), stack 10 has a low trasmittance or high reflectance. However, in the 1.3 μm range, referenced at 20, stack 10 produces a high transmission characteristic with almost no ripple. Exemplary stack 10 with this transmission spectrum can be used as a partial mirror within an interference filter tuned to transmit a passband in the 1.3 μm range.

Figure 7:
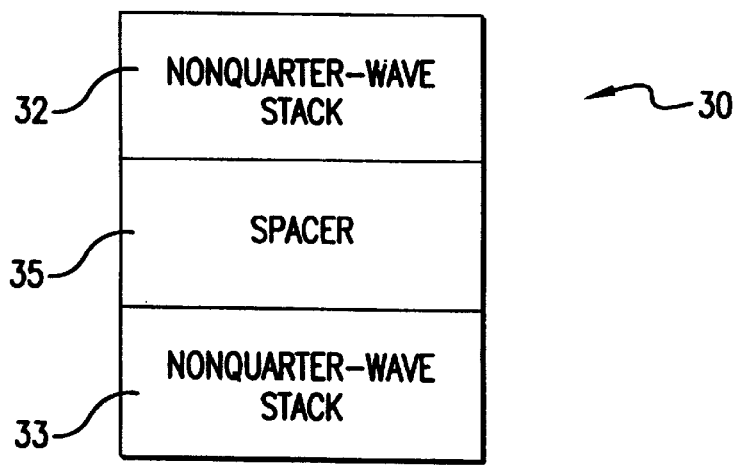
FIG. 7 schematically illustrates a single cavity interference filter in accordance with the present invention.

FIG. 7 schematically illustrates a single cavity interference filter 30 comprising a first stack 32 and a second stack 33 separated by spacer 35. The spacer can be a material with a low refractive index, such as $SiO_2$ (1.44). In accordance with the present invention, each of the stacks 32, 33 are quadratically chirped using equation (1). FIG. 8 illustrates exemplary optical thickness values ($t_n$) for a thirty one layer (M) single cavity interference filter where dielectric layers 1–15 form first stack 32, layer 16 corresponds to the low index spacer 35, and layers 17–31 form second stack 33. The symmetrical optical thickness values of these quadratically chirped layers is demonstrated by layers 1 and 15 which have substantially the same optical thickness (1.1500000), layers 2 and 14 which have substantially the same optical thickness (1.1102041), and so on for first stack 32. Similarly, layers 17 and 31 have substantially the same optical thickness (1.1500000), layers 18 and 30 have substantially same optical thickness (1.1102041) and so on for second stack 33. Again, it should be understood that these optical thicknesses are provided for illustrative purposes only. In addition, when applying equation (1) to determine the optical thickness of each layer included in a cavity, it is important to point out that "N" refers to the number of layers in a stack and not to the number of total layers "M" in the cavity. Likewise "n" refers to the particular layer number in a stack and not to the layer number "m" within a cavity. For example, FIG. 8 lists 31 layers in the cavity, but for m=18, n=2 in equation (1) because the eighteenth layer in the cavity corresponds to the second layer in the second stack comprised of layers 17–31. Similarly, for m=30, n=14 because the thirtieth layer in the cavity corresponds to the fifteenth layer in the second stack.

Figure 9:
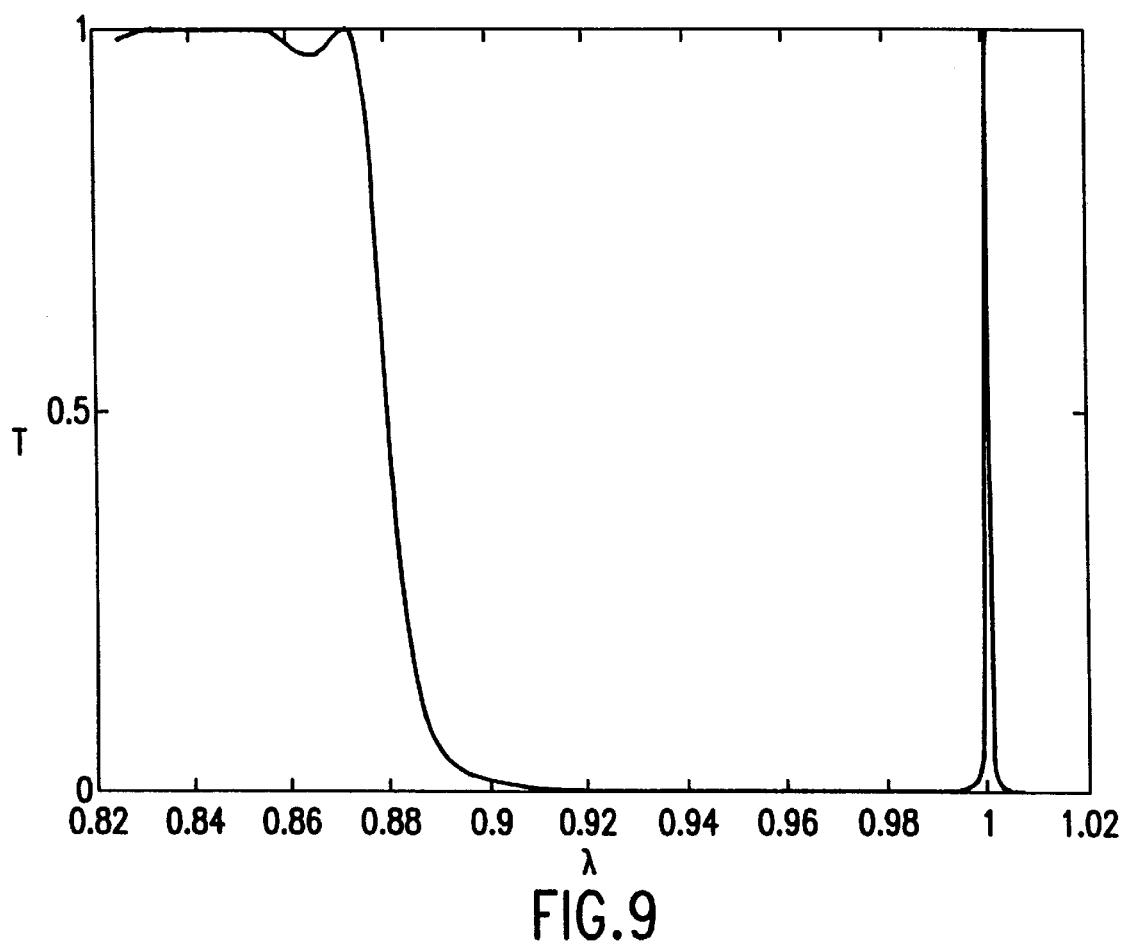
FIG. 9 is a transmission spectrum normalized to 1.55 μm for the single cavity interference filter described with reference to FIG. 7 in accordance with the present invention.

FIG. 9 is an exemplary transmission spectrum normalized to 1.55 μm for the single cavity, thirty one layer, interference filter shown in FIG. 7. As can be seen, a high transmission spike is present at $\lambda/\lambda_0=1.0$ which corresponds to a wavelength in the 1.5 μm range (approximately 1550 nm) and a relatively ripple-free transmission characteristic at approximately 0.845 which corresponds to a wavelength in the 1.3 μm range (approximately 1310 nm). Thus, a single cavity interference filter with a pair of quadratically chirped stacks provides high transmittance at a first passband in the 1.5 μm range and at a second passband in the 1.3 μm range which can correspond to a payload channel wavelength and a service channel wavelength, respectively, within an optical network.

The interference filter in accordance with the present invention can also be formed by depositing cavities having quadratically chirped stacks on top of other cavities having quadratically chirped stacks. For example, the thirty one layer single cavity filter 30 described with reference to FIG. 7 can be deposited on top of another cavity, and so on, to form a multi-cavity interference filter. An additional coupling layer is deposited between the cavities. The resulting transmission spectrum for such a multi-cavity filter broadens the transmission of wavelengths in the 1550 nm range while retaining the relatively ripple-free transmission characteristic corresponding to wavelengths in the 1310 nm range. This is beneficial because the sharp peak at 1 of FIG. 9 is too narrow to tune a particular optical source associated with a payload channel wavelength (1.5 μm range).

In another embodiment of the present invention, an interference filter provides transmission for a first passband in the 1.5 μm range corresponding to a payload channel wavelength and for a second passband in the 1625 nm range corresponding to a service channel wavelength. The alternative embodiment is based on the following equation:

$$t_n = 1 - 0.06 \left[ \frac{\frac{(N-1)}{2} - n + 1}{\frac{(N-1)}{2}} \right]^2 \quad (2)$$

where $t_n$ is the optical thickness associated with a particular layer, N is the total number of layers used to form an individual stack or mirror and n is the number of the particular layer within the stack. In this embodiment, the wavelength, distance from the payload channel range (1550 nm) to the service channel range (1625 nm) is approximately 75 nm. This is much shorter as compared to the distance between the same payload channel and the service channel in the 1.3 μm range which is approximately 240 nm. Because of this short distance, equation (2) includes a change in the magnitude of the chirp from 0.15 to 0.06. In addition, the number of layers in each cavity increases to approximately 119 where layers 1–59 form a first stack or mirror, layer 60 corresponds to a low index spacer material, and layers 61–119 form the second stack. FIG. 10 lists exemplary optical thickness values for the single cavity filter where layers 1–59 corresponds to the first stack, layer 60 corresponds to the spacer, and layers 61–119 correspond to the second stack.

Figure 11:
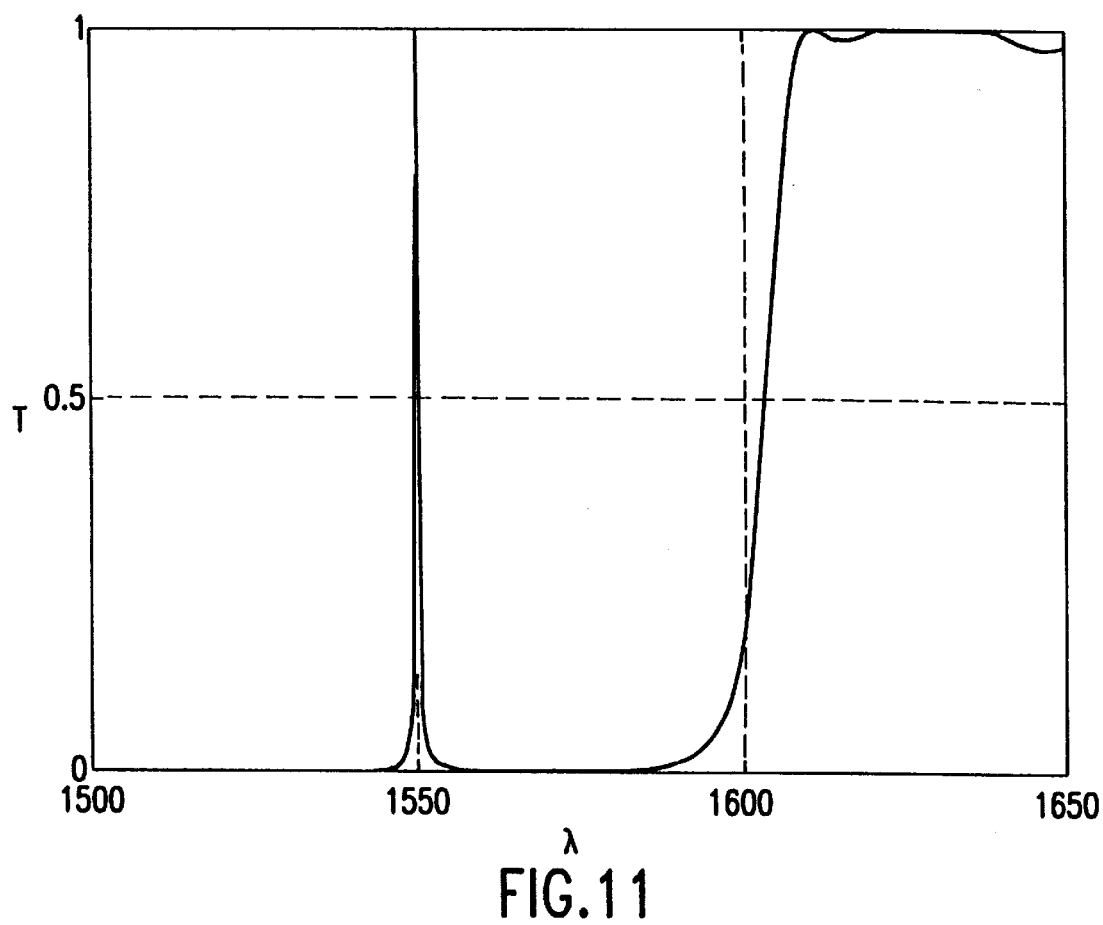
FIG. 11 is a transmission spectrum for the single cavity interference filter described with reference to FIG. 10 in accordance with the present invention.

FIG. 11 illustrates an exemplary transmission spectrum for the single cavity, 119 layer interference filter having the optical thickness values listed with reference to FIG. 10. As can be seen, a high transmission spike is present at approximately 1550 nm while a relatively ripple-free transmission characteristic is present in the 1625 nm range. Thus, a single cavity interference filter with a pair of quadratically chirped stacks provides high transmission at a first passband in the 1550 nm range and at a second passband in the 1625 nm range which can correspond to a payload channel wavelength and a service channel wavelength, respectively, within an optical network.

Figure 12:
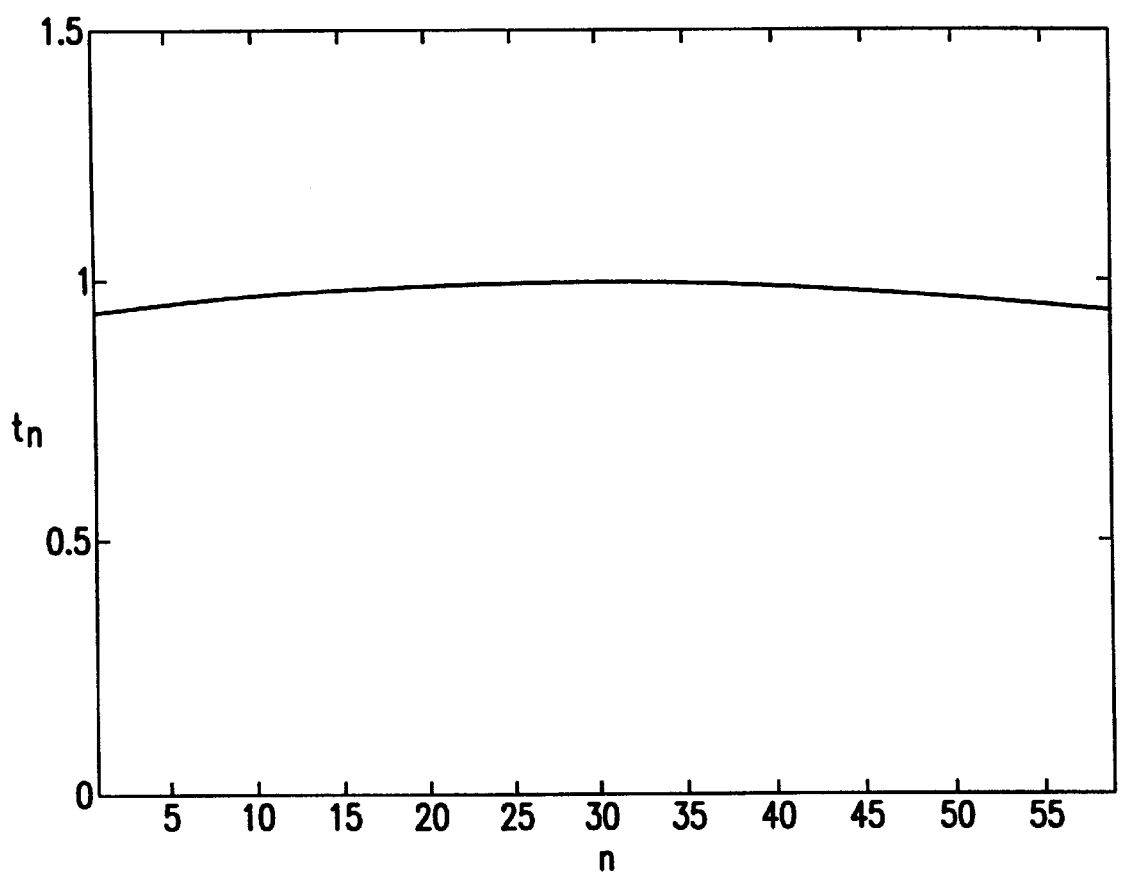
FIG. 12 is a graphical illustration of the optical thickness values of the dielectric layers listed in FIG. 10.

For illustrative purposes, FIG. 12 is a graphical representation of the optical thickness values for the dielectric layers listed in FIG. 10 producing a graph with a somewhat convex shape.

Again, the interference filter can also be formed by depositing cavities having quadratically chirped stacks on top of other cavities having quadratically chirped stacks similar to the configuration shown in FIG. 7. For example, the 119 layer cavity described with reference to FIG. 11 can be deposited on top of another cavity with a coupling layer therebetween to form a multi-cavity interference filter. The resulting transmission spectrum for such a multi-cavity filter broadens the transmission of wavelengths in the 1550 nm range shown in FIG. 12 while retaining the relatively ripple-free transmission characteristic corresponding to wavelengths in the 1310 nm range. The multi-cavity filter increases and squares the passband associated with the payload channel wavelengths while retaining the relatively ripple-free transmission characteristic associated with service channel wavelengths in the 1625 nm range.

Although the invention has been particularly shown and described with reference to several embodiments thereof, it will be understood by those skilled in the art that various changes in form and details may be made therein without departing from the spirit and scope of the invention as defined in the appended claims.

What is claimed is:

1. An optical interference filter comprising:
    a substrate having a surface; and an optical cavity, said cavity comprising:
        a first reflector having a first stack deposited on said surface of said substrate, said first stack including a first plurality of dielectric layers, each of selected ones of said first plurality of dielectric layers having a respective one of a plurality of first optical thicknesses, said plurality of first optical thicknesses varying in a first direction with respect to said substrate within said first reflector;
        a second reflector having a stack including a second plurality of dielectric layers, each of selected ones of said second plurality of dielectric layers having a respective one of a plurality of second optical thicknesses, said plurality of second optical thicknesses varying in said first direction with respect to said substrate within said second reflector; and
        a spacer interposed between said first and second reflectors, said optical interference filter having an associated transmission characteristic having first and second passbands, said first passband encompassing at least one optical channel having a wavelength substantially equal to 1.55 μm, said first passband having an associated first transmissivity and said second passband having an associated second transmissivity, said first and second transmissivities being substantially equal to 100%.

2. The optical interference filter in accordance with claim 1 wherein said first plurality of optical thicknesses varies in accordance with:

$$t_n = 1 + 0.15\left[\frac{\frac{(N-1)}{2} - n + 1}{\frac{(N-1)}{2}}\right]^2$$

where $t_n$ corresponds to respective normalized optical thicknesses of said selected ones of said first plurality of dielectric layers, N corresponds to a total number of said first plurality of dielectric layers and n corresponds to a particular one of said first plurality of dielectric layers.

3. The optical interference filter in accordance with claim 1 wherein said second plurality of optical thicknesses varies in accordance with:

$$t_n = 1 + 0.15\left[\frac{\frac{(N-1)}{2} - n + 1}{\frac{(N-1)}{2}}\right]^2$$

where $t_n$ corresponds to respective normalized optical thicknesses of said selected ones of said second plurality of dielectric layers, N corresponds to a total number of said second plurality of dielectric layers and n corresponds to a particular one of said second plurality of dielectric layers.

4. The optical interference filter in accordance with claim 1 wherein said first plurality of optical thicknesses varies in accordance with:

$$t_n = 1 - 0.06\left[\frac{\frac{(N-1)}{2} - n + 1}{\frac{(N-1)}{2}}\right]^2$$

where $t_n$ corresponds to respective normalized optical thicknesses of said selected ones of said first plurality of dielectric layers, N corresponds to a total number of said first plurality of dielectric layers and n corresponds to a particular one of said first plurality of dielectric layers.

5. The optical interference filter in accordance with claim 1, wherein said second plurality of optical thicknesses varies in accordance with:

$$t_n = 1 - 0.06\left[\frac{\frac{(N-1)}{2} - n + 1}{\frac{(N-1)}{2}}\right]^2$$

where $t_n$ corresponds to respective normalized optical thicknesses of said selected ones of said second plurality of dielectric layers, N corresponds to a total number of said second plurality of dielectric layers and n corresponds to a particular one of said second plurality of dielectric layers.

6. The optical interference filter in accordance with claim 1 wherein each of said first plurality of dielectric layers are arranged in an alternating sequence of high refractive index material layers abutting low index material layers.

7. The optical interference filter in accordance with claim 1 wherein said second plurality of dielectric layers are arranged in an alternating sequence of high refractive index material layers abutting low index material layers.

8. The optical interference filter in accordance with claim 1 wherein said first plurality of dielectric layers are selected from the group consisting essentially of $SiO_2$, $Ta_2O_5$, $TiO_2$, $Al_2O_3$, $HfO_2$, and $ZrO_2$.

9. The optical interference filter in accordance with claim 1 wherein said second plurality of dielectric layers are selected from the group consisting essentially of $SiO_2$, $Ta_2O_5$, $TiO_2$, $Al_2O_3$, $HfO_2$, and $ZrO_2$.

10. The optical interference filter in accordance with claim 1 wherein said spacer is formed of a dielectric material having a low refractive index.

11. The optical interference filter in accordance with claim 1, wherein said second passband encompassing at least one optical channel having a wavelength substantially equal to 1.31 $\mu$m.

12. The optical interference filter in accordance with claim 1, wherein said second passband encompassing at least one optical channel having a wavelength substantially equal to 1.625 $\mu$m.

13. A multi cavity optical interference filter comprising:
a plurality of cavities, each of said cavities being separated by a coupling layer, each of said plurality of cavities comprising:
a first stack including a first plurality of dielectric layers, each of selected ones of said first plurality of dielectric layers having a respective one of a plurality of first optical thicknesses, said first plurality of optical thicknesses varying over a first group of said first plurality of dielectric layers;
a second stack including a second plurality of dielectric layers, each of selected ones of said second plurality of dielectric layers having a respective one of a plurality of second optical thicknesses, said second plurality of optical thicknesses varying over a second group of said second plurality of dielectric layers; and
a spacer interposed between said first and second stacks, said optical interference filter having an associated transmission characteristic having first and second passbands, said first passband encompassing at least one optical channel having a wavelength substantially equal to 1.55 $\mu$m, said first passband having an associated first transmissivity and said second passband having an associated second transmissivity, said first and second transmissivities being substantially equal to 100%.

14. The multi cavity interference filter in accordance with claim 13 wherein said first plurality of optical thicknesses varies in accordance with:

$$t_n = 1 + 0.15\left[\frac{\frac{(N-1)}{2} - n + 1}{\frac{(N-1)}{2}}\right]^2$$

where $t_n$ corresponds to respective normalized optical thicknesses of said selected ones of said first plurality of dielectric layers, N corresponds to a total number of said first plurality of dielectric layers and n corresponds to a particular one of said first plurality of dielectric layers.

15. The optical interference filter in accordance with claim 13 wherein said second plurality of optical thicknesses varies in accordance with:

$$t_n = 1 + 0.15\left[\frac{\frac{(N-1)}{2} - n + 1}{\frac{(N-1)}{2}}\right]^2$$

where $t_n$ corresponds to respective normalized optical thicknesses of said selected ones of said second plurality of dielectric layers, N corresponds to a total number of said second plurality of dielectric layers and n corresponds to a particular one of said second plurality of dielectric layers.

16. The optical interference filter in accordance with claim 13 wherein said first plurality of optical thicknesses varies in accordance with:

$$t_n = 1 - 0.06\left[\frac{\frac{(N-1)}{2} - n + 1}{\frac{(N-1)}{2}}\right]^2$$

where $t_n$ corresponds to respective normalized optical thicknesses of said selected ones of said first plurality of dielectric layers, N corresponds to a total number of said first plurality of dielectric layers and n corresponds to a particular one of said first plurality of dielectric layers.

17. The optical interference filter in accordance with claim 13 wherein said second plurality of optical thicknesses varies in accordance with:

$$t_n = 1 - 0.06\left[\frac{\frac{(N-1)}{2} - n + 1}{\frac{(N-1)}{2}}\right]^2$$

where $t_n$ corresponds to respective optical thicknesses of said selected ones of said second plurality of dielectric layers, N corresponds to a total number of said second plurality of dielectric layers and n corresponds to a particular one of said second plurality of dielectric layers.

18. The optical interference filter in accordance with claim 13 wherein each of said first plurality of dielectric layers are arranged in an alternating sequence of high refractive index material layers abutting low index material layers.

19. The optical interference filter in accordance with claim 13 wherein each of said second plurality of dielectric layers are arranged in an alternating sequence of high refractive index material layers abutting low index material layers.

20. The optical interference filter in accordance with claim 13 wherein each of said spacers is formed of a dielectric material having a low refractive index.

21. The optical interference filter in accordance with claim 13, wherein said second passband encompassing at least one optical channel having a wavelength substantially equal to 1.31 μm.

22. The optical interference filter in accordance with claim 13 wherein said optical interference filter includes a coupling layer being configured to couple adjacent ones of said plurality of cavities, said coupling layer including a material having a high index of refraction.

23. The optical interference filter in accordance with claim 13 wherein said optical interference filter includes a coupling layer being configured to couple adjacent ones of said plurality of cavities, said coupling layer including a material having a high index of refraction.

24. The optical interference filter in accordance with claim 13, wherein said second passband encompassing at least one optical channel having a wavelength substantially equal to 1.625 μm.

\* \* \* \* \*